(12) United States Patent  
Jackson

(10) Patent No.: US 9,422,969 B2
(45) Date of Patent: Aug. 23, 2016

(54) LOCKING SYSTEM

(71) Applicant: Allen Forrest Jackson, Little Rock, AR (US)

(72) Inventor: Allen Forrest Jackson, Little Rock, AR (US)

(*) Notice: Subject to any disclaimer, the term of this patent is extended or adjusted under 35 U.S.C. 154(b) by 0 days.

(21) Appl. No.: 13/766,936

(22) Filed: Feb. 14, 2013

(65) Prior Publication Data

US 2013/0149068 A1 Jun. 13, 2013

Related U.S. Application Data

(63) Continuation-in-part of application No. 12/855,516, filed on Aug. 12, 2010, now Pat. No. 8,398,349.

(51) Int. Cl.
| *F16B 39/00* | (2006.01) |
| *F16B 39/04* | (2006.01) |
| *F16B 39/08* | (2006.01) |
| F16B 37/14 | (2006.01) |
| F16B 21/14 | (2006.01) |

(52) U.S. Cl.
CPC ............... *F16B 39/04* (2013.01); *F16B 39/08* (2013.01); *F16B 37/145* (2013.01); *F16B 2021/14* (2013.01)

(58) Field of Classification Search
CPC ...................................................... F16B 39/04
USPC .......... 411/209–215, 315–318, 348, 243–245
See application file for complete search history.

(56) References Cited

U.S. PATENT DOCUMENTS

| 684,928 | A | * | 10/1901 | Fletcher | 411/271 |
| 854,590 | A | * | 5/1907 | Musser | 411/197 |
| 1,010,457 | A | * | 12/1911 | Shuter | 411/209 |
| 1,099,510 | A | * | 6/1914 | O'Conner | 411/320 |
| 1,305,698 | A | * | 6/1919 | Day | 411/190 |
| 1,376,624 | A | * | 5/1921 | Ivory | 411/244 |
| 1,438,312 | A | * | 12/1922 | Kerwin | 411/315 |
| 1,540,055 | A | * | 6/1925 | Chilton | 411/213 |
| 1,994,132 | A | * | 3/1935 | Harbridge | 411/320 |
| 2,308,605 | A | * | 1/1943 | Hillstrom | 411/210 |
| 3,097,559 | A | * | 7/1963 | Chapman | 411/348 |
| 2010/0080666 | A1 | * | 4/2010 | Dahl | |

* cited by examiner

*Primary Examiner* — Flemming Saether
(74) *Attorney, Agent, or Firm* — Richard Blakely Glasgow

(57) ABSTRACT

A system for fastening a first object to one or more other objects that prevents unfastening due to vibration until unlocked. The locking system includes: (a) girder having a first end that has an externally threaded terminus defining an internally counter-threaded bore; (b) a nut having an essentially planar top surface and an internally threaded bore for rotational engagement with the terminus of the girder, wherein the essentially planar top surface comprises at least two notches on opposite sides of the threaded bore of the nut; and (c) a counter-threaded bolt having a diameter smaller than the bore of the nut and a length sufficient to rotationally engage the bore of said girder while inserted through the bore of the girder, wherein the bolt comprises a head cooperating with the at least two notches for preventing substantial relative rotation of the bolt with the girder.

9 Claims, 4 Drawing Sheets

FIG.1.1
FIG.1.2
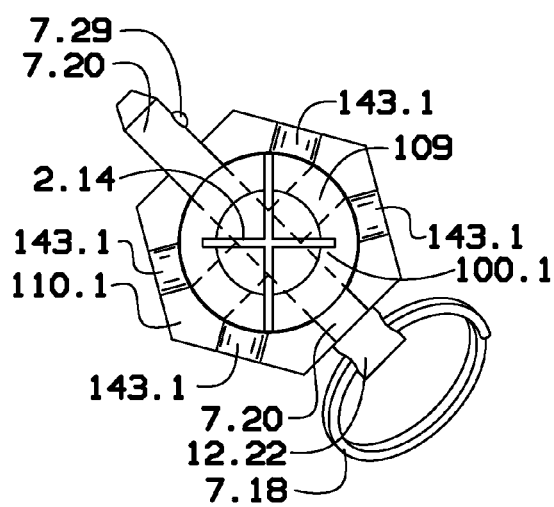
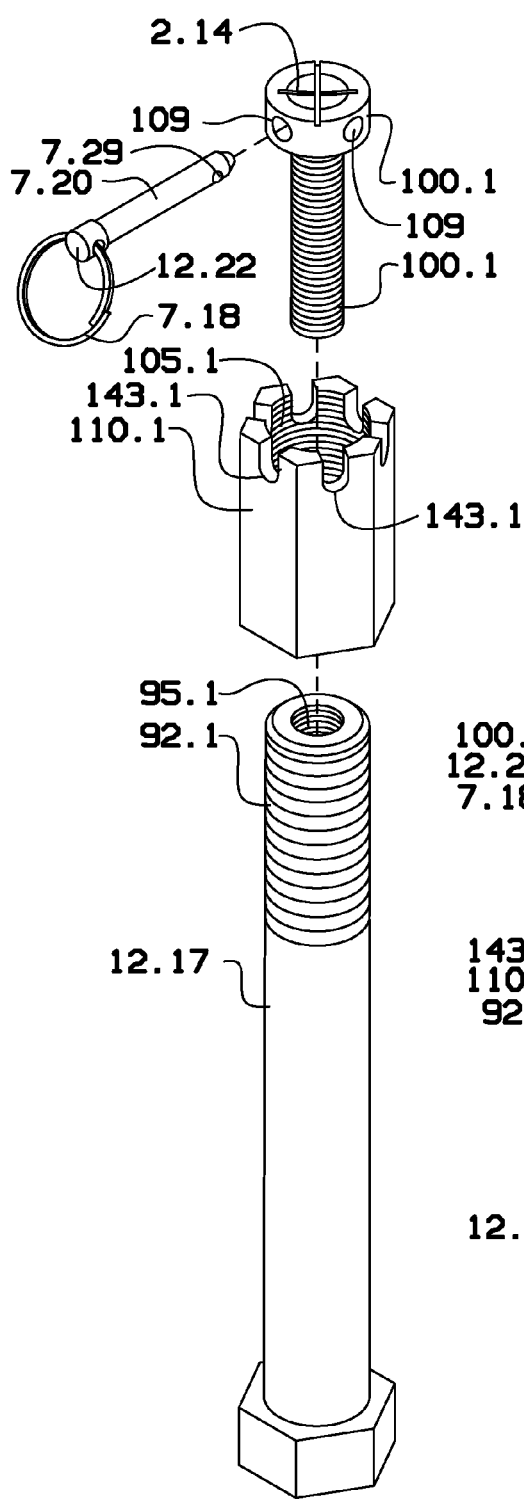
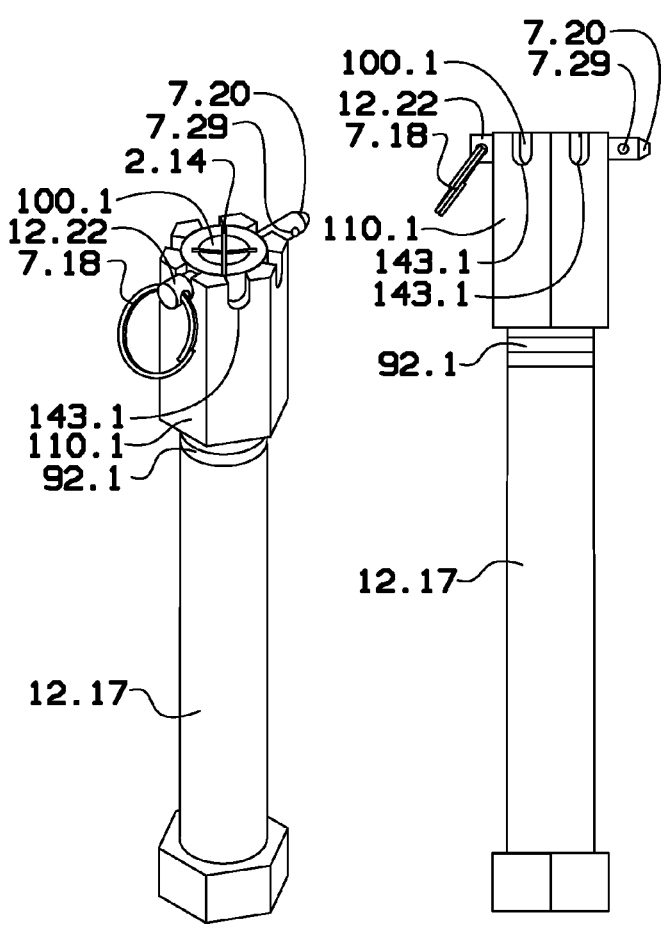
FIG.1.3   FIG.1.4

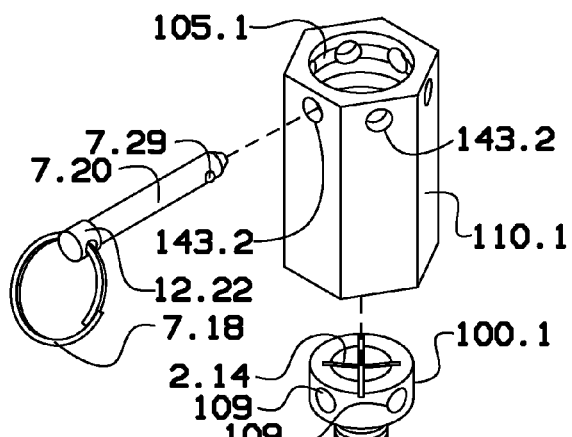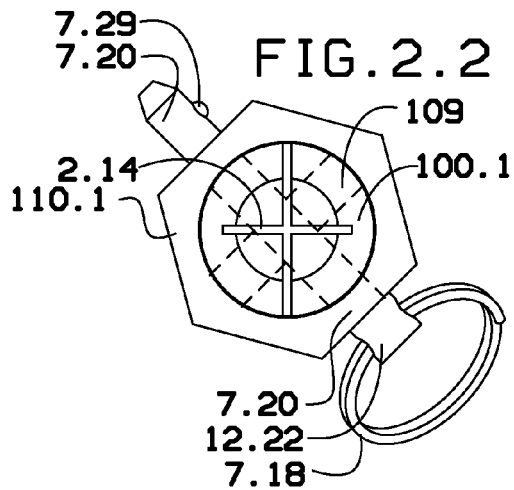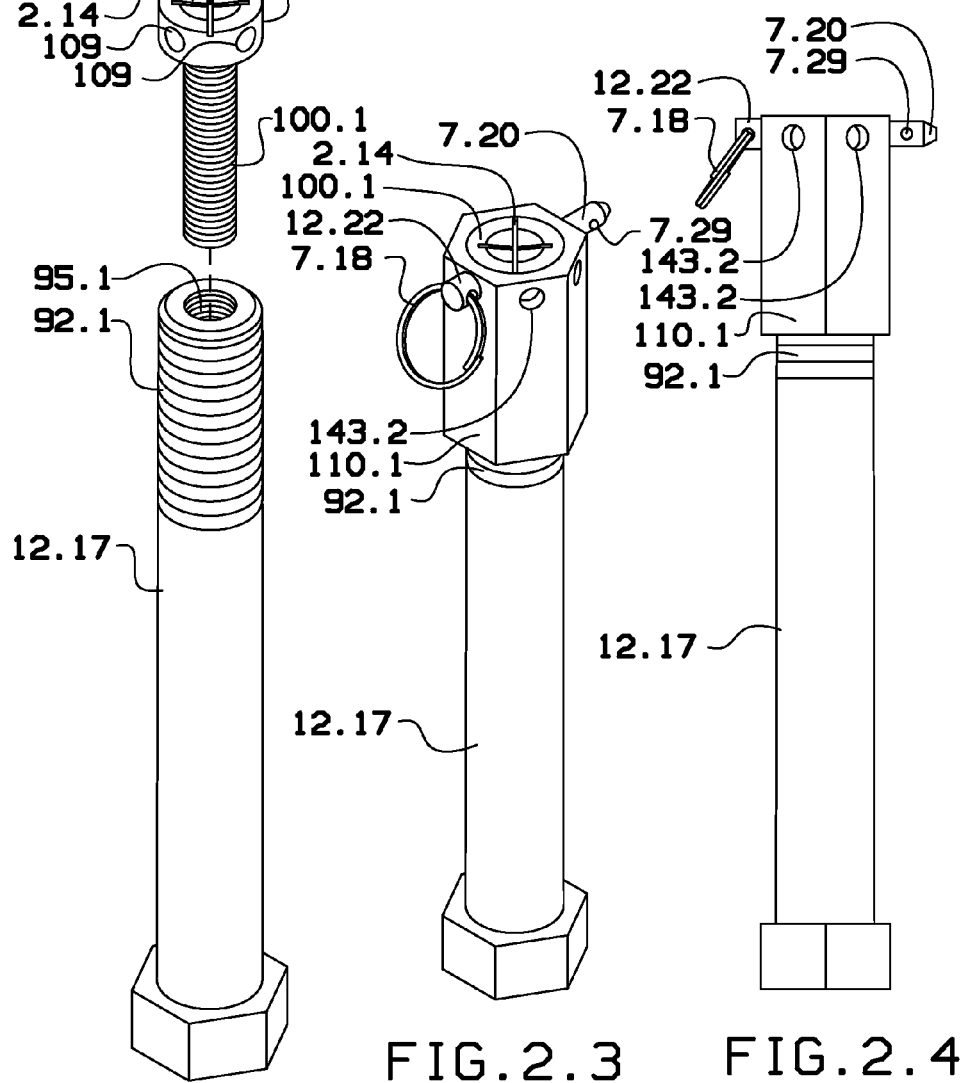

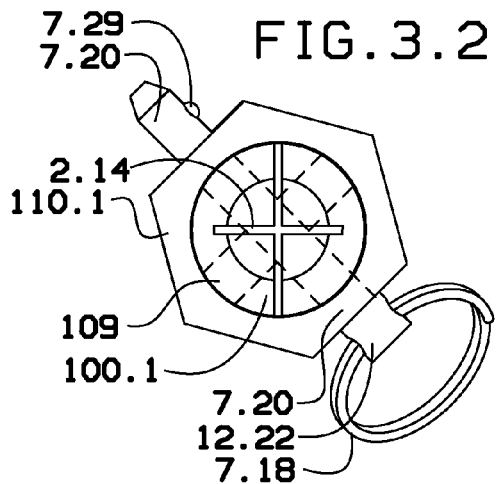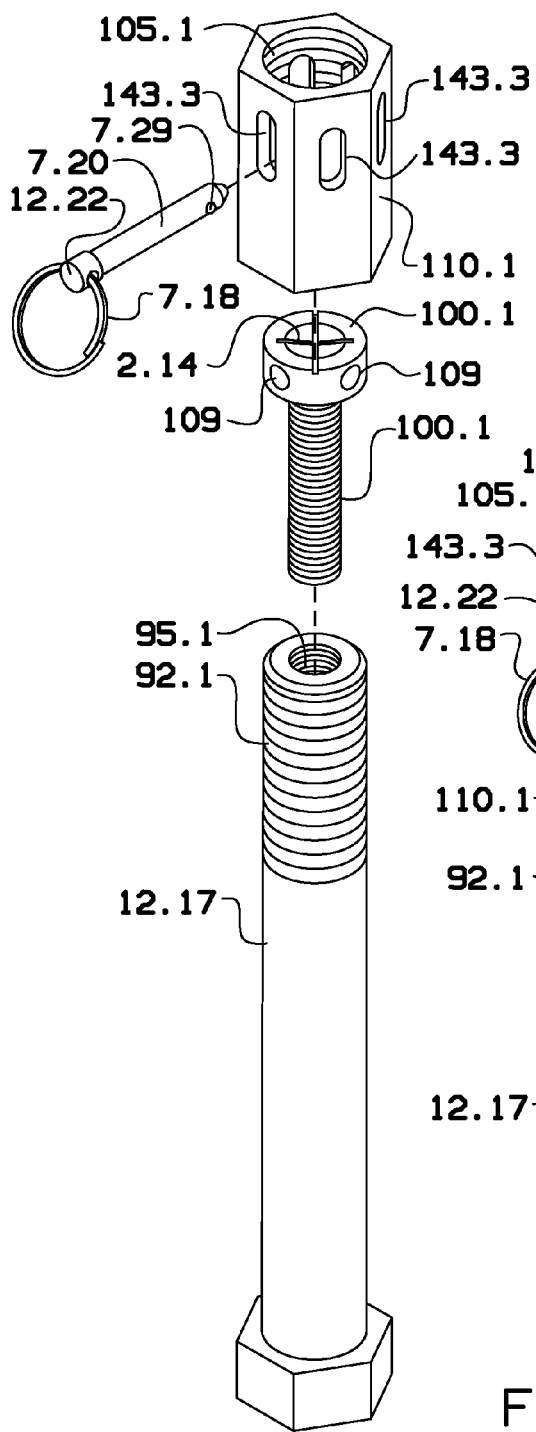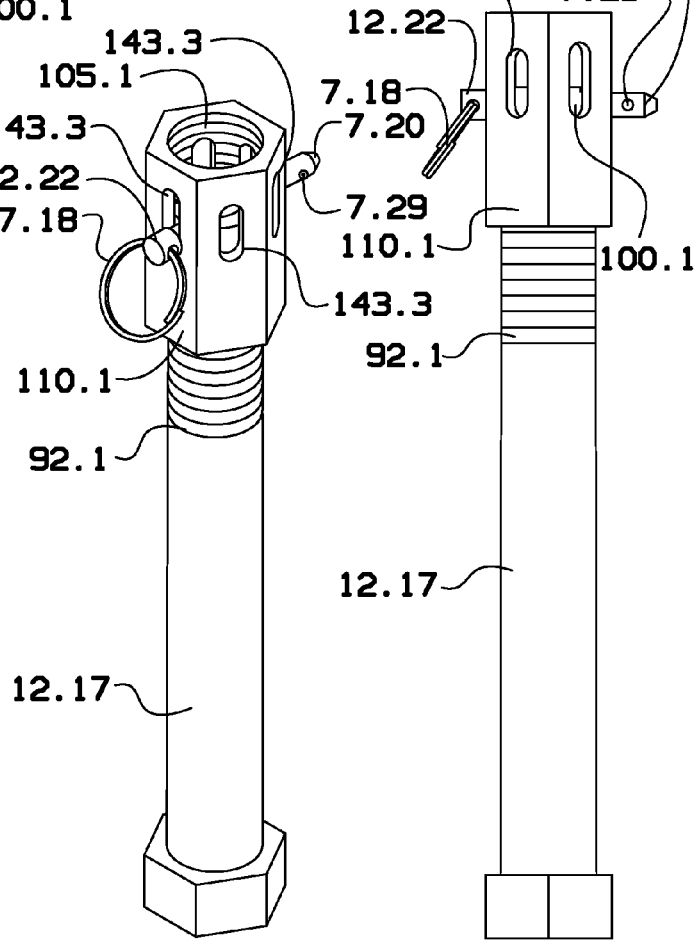

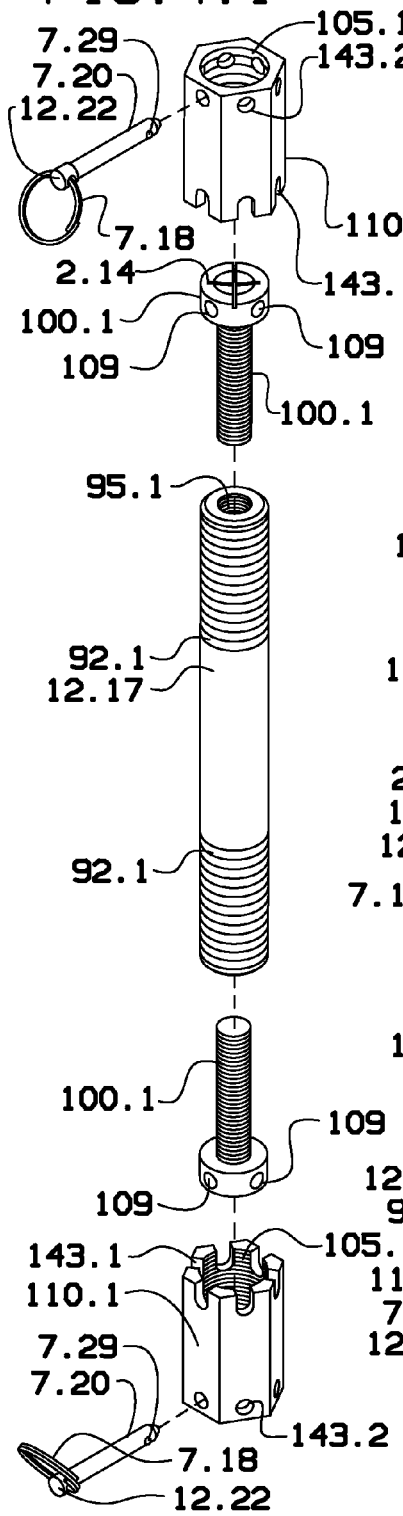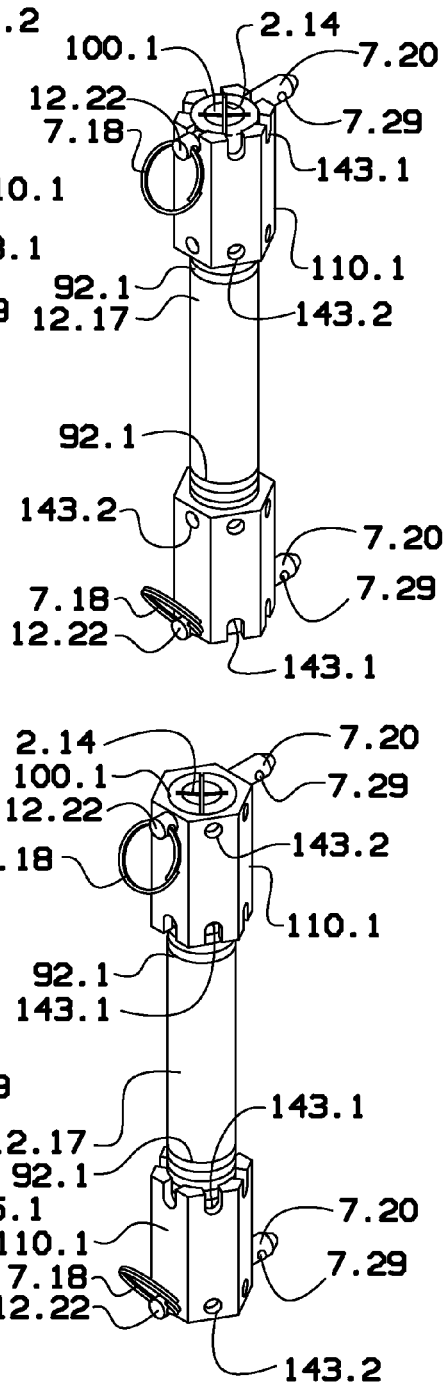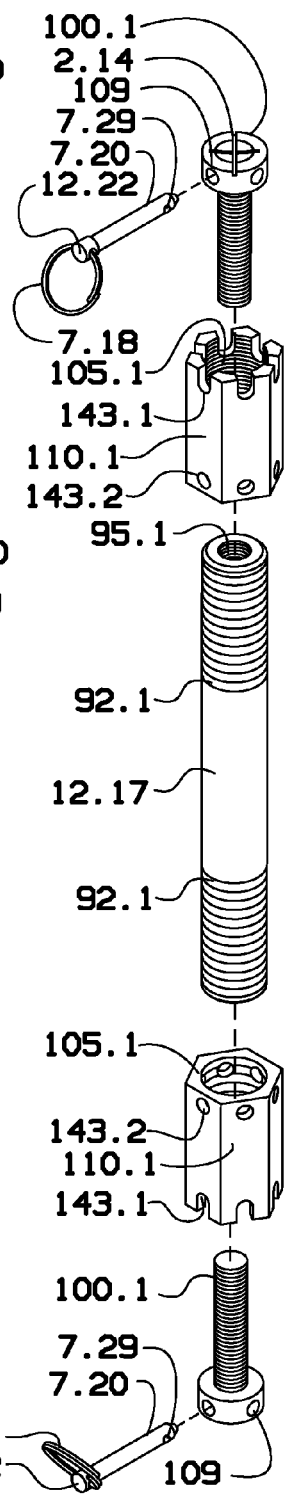

LOCKING SYSTEM

CROSS-REFERENCE TO RELATED APPLICATIONS

This application is a continuation-in-part of, and claims the benefit of, currently pending U.S. application Ser. No. 12/855,516, filed on Aug. 12, 2010, entitled "Locking System and Method of Using Same," the disclosure of which is incorporated herein by reference.

STATEMENT REGARDING FEDERALLY SPONSORED RESEARCH OR DEVELOPMENT

Not applicable

BACKGROUND OF THE INVENTION

1. Field of the Invention

The present invention relates generally to the field of fastening and locking systems for use in any application wherein at least one object (or element) is to be fastened to another object, especially when one or both will be subjected to vibration, rotation or other movement tending to unfasten the objects.

2. Brief Description of the Related Art

Traditional screw-type fasteners have a clockwise spiral groove that corresponds with an object's threaded core for fastening. In certain instances, upon experiencing a vibration, the fastener is unwound and loosened in a counterclockwise rotation away from the object.

Prior art locking systems do not provide a fastening system that counteracts the loosening of a fastener upon experiencing a vibration. The need affects many industries and applications, including, but not limited to, the medical industry (surgical and orthopedic fasteners), mining and natural gas recovery (pipe and fittings), the oil industry (drilling rigs and platforms), the aircraft and aerospace industry (aircraft and aerospace nuts and bolts), shipping (propellers and superstructures), heavy industry (wind turbine blades and base fastening), military (tank and heavy vehicles), bridges and buildings (scaffolding and girders), and automobile industry (attaching automobile wheels to axles).

It would therefore be desirable to develop a locking system for fastening a first object to one or more other objects that prevents unfastening due to vibration until unlocked.

BRIEF SUMMARY OF THE INVENTION

The present invention is directed to a locking system comprising: (a) a girder having a first end and a second end, wherein said first end comprises an externally threaded terminus defining an internally counter-threaded bore; (b) at least one nut having an essentially planar top surface and an internally threaded bore for rotational engagement with said terminus of said girder, wherein said essentially planar top surface comprises at least two notches on opposite sides of said threaded bore of said nut; and (c) at least one counter-threaded bolt having a diameter smaller than said bore of said nut and a length sufficient to rotationally engage said bore of said girder while inserted through said bore of said girder, wherein said bolt comprises a head cooperating with said at least two notches for preventing substantial relative rotation of said bolt with said girder.

The present invention is also directed to a locking system comprising: (a) a girder having a first end and a second end, wherein said first end comprises an externally threaded terminus defining an internally counter-threaded bore; (b) at least one nut having a plurality of essentially vertical side walls and an internally threaded bore for rotational engagement with said terminus of said girder, wherein said plurality of essentially vertical side walls comprises at least two round apertures on opposite sides of said threaded bore of said nut; and (c) a counter-threaded bolt having a diameter smaller than said bore of said nut and a length sufficient to rotationally engage said bore of said girder while inserted through said bore of said girder, wherein said bolt comprises a head cooperating with said at least two round apertures for preventing substantial relative rotation of said bolt with said girder.

The present invention is further directed to a locking system comprising: (a) a girder having a first end and a second end, wherein said first end comprises an externally threaded terminus defining an internally counter-threaded bore; (b) at least one nut having a plurality of essentially vertical side walls and an internally threaded bore for rotational engagement with said terminus of said girder, wherein said plurality of essentially vertical side walls comprises at least two oblong apertures on opposite sides of said threaded bore of said nut; and (c) a counter-threaded bolt having a diameter smaller than said bore of said nut and a length sufficient to rotationally engage said bore of said girder while inserted through said bore of said girder, wherein said bolt comprises a head cooperating with said at least two oblong apertures for preventing substantial relative rotation of said bolt with said girder.

These and other features, objects and advantages of the present invention will become better understood from a consideration of the following detailed description of the preferred embodiments and appended claims in conjunction with the drawings as described following:

BRIEF DESCRIPTION OF THE DRAWINGS

FIG. 1.1 is an exploded view of the first preferred embodiment of the present invention.

FIG. 1.2 is a top plan view of the first preferred embodiment of the present invention.

FIG. 1.3 is a perspective view of the first preferred embodiment of the present invention.

FIG. 1.4 is a front plan view of the first preferred embodiment of the present invention.

FIG. 2.1 is an exploded view of the second preferred embodiment of the present invention.

FIG. 2.2 is a top plan view of the second preferred embodiment of the present invention.

FIG. 2.3 is a perspective view of the second preferred embodiment of the present invention.

FIG. 2.4 is a front plan view of the second preferred embodiment of the present invention.

FIG. 3.1 is an exploded view of the third preferred embodiment of the present invention.

FIG. 3.2 is a top plan view of the third preferred embodiment of the present invention.

FIG. 3.3 is a perspective view of the third preferred embodiment of the present invention.

FIG. 3.4 is a front plan view of the third preferred embodiment of the present invention.

FIG. 4.1 is an exploded view of the fourth preferred embodiment of the present invention.

FIG. 4.2 is a perspective view of the fourth preferred embodiment of the present invention.

FIG. 4.3 is an perspective view of the fourth preferred embodiment of the present invention.

FIG. 4.4 is a exploded view of the fourth preferred embodiment of the present invention.

DETAILED DESCRIPTION OF THE INVENTION

With reference to FIGS. 1.1-4.4, the preferred embodiments of the present invention may be described. The locking system includes a girder or bolt (12.17), a center bolt (100.1), a locking nut (110.1), and a locking pin (7.20). The girder (12.17) includes a shaft arising out of (or anchored to) a first object for fastening to a second object. The girder (12.17) has an externally threaded terminus or end-point (92.1) defining an internally counter-threaded axial bore (95.1). The girder's (12.17) externally threaded end-point (92.1) rotatably receives a locking nut (110.1). The girder (12.17) extends through an opening in the first object and the locking nut (110.1) is screwed onto the girder terminus (92.1) a sufficient number of rotations to achieve the desired amount of fastening. The locking nut (110.1) is formed of any material (e.g. steel or polymer) and has a central internally threaded transplanar bore (105.1) sufficient to produce interlocking threads between the girder (12.17) and the locking nut (110.1).

As shown in FIGS. 1.2, 2.2, and 3.2, the exterior of locking nut (110.1) is preferably hexagon-shaped and thus has six vertical sides and six angled edges connecting the sides. It should be understood, however, that the exterior of the locking nut (110.1) can be of other shapes, including round (e.g. disc-shaped) or square. Each of the six exterior sides of the locking nut (110.1) is configured to receive a locking pin (7.20) in either a notch or an aperture. In a first embodiment, as shown in FIG. 1.1, the top planar surface of the locking nut is notched, preferably forming six crenels (143.1). The crenels (143.1) are closed at their bottom surface and open at their top surface. On opposite sides of each crenel (143.1) is a merlon having a height greater than that of the crenels (143.1). The six merlons are preferably positioned at the vertical edges of the six sides of the locking nut (110.1). In a second embodiment, as shown in FIG. 2.1, the locking nut (110.1) includes a round aperture (143.2) on each of the six vertical sides of the locking nut (110.1) that extends through the exterior surface of the locking nut (110.1) and into the bore (105.1). The diameter of the apertures (143.2) is slightly greater than the diameter of the locking pin (7.20). In a third embodiment, as shown in FIG. 3.1, the locking nut (110.1) includes an oblong aperture (143.3) on each of the six vertical sides of the locking nut (110.1) that extends through the exterior surface of the locking nut (110.1) and into the bore (105.1). The width of the apertures (143.3) is slightly greater than the diameter of the locking pin (7.20).

The locking system of the present invention also includes a bolt (100.1). The bolt (100.1) is a counter-threaded spiral bolt that screws into the counter-threaded bore (95.1) of the girder (12.17). The length of the bolt (100.1) is sufficiently long enough to produce a holding resistance within the girder (12.17). Because the diameter of the bolt (100.1) is smaller than the diameter of the locking nut's bore (105.1), the bolt (100.1) easily passes through the bore and into the girder's (12.17) counter-threaded axial bore (95.1). The bolt (100.1) can be completely inserted into the girder's axial bore (95.1) until the threads of the bolt (100.1) are completely engaged by the threads of the bore (95.1) of the girder (12.17) or until the bottom of the bolt (100.1) contacts the bottom of the bore (95.1) of the girder (12.17).

The top of the head of the bolt (100.1) includes cross grooves (2.14) to allow the bolt (100.1) to be rotated using a screwdriver or similar tool. The head of the bolt (100.1) also includes four apertures (109) for receiving the locking pin (7.20). The bolt apertures (109) are preferably equally spaced around the outer face of the head of the bolt (100.1). The pin (7.20) preferably is a stainless steel push-pin. The pin (7.20) passes through two of the bolt's (100.1) apertures (109) positioned on opposite sides of one another, and is secured to the bolt (100.1) by the pin's (7.20) spring-biased detent ball (7.29). Instead of a spring-biased detent ball (7.29), the pin (7.20) may alternatively have any form of wedge-type retraction stop that would be well-known to those skilled in the art. The pin (7.20) includes an end stop (12.22) and a pull ring (7.18) for blocking push-through and for gripping. The end-stop (12.22) preferably is an end-point of the pin (7.20) having a greater diameter than both the shaft of the pin (7.20) and any channels or apertures that receive the pin (7.20).

To assemble and use the locking system of the first embodiment, the counter-threaded bolt (100.1) is screwed into the counter-threaded bore (95.1) of the girder (12.17). The portion of the bolt (100.1) that is not screwed into the bore (95.1) of the girder (12.17) is then slid through bore (105.1) of the locking nut (110.1) until the internal threads of the bore (105.1) of the locking nut (110.1) contact the external threads (92.1) of the girder (12.17). The locking nut (110.1) is then screwed onto the girder (12.17) to the desired torque, then the cross grooves (2.14) are used to adjust the counter-threaded bolt (100.1) until one of the notches or crenels (143.1) of the locking nut (110.1) is aligned with one of the apertures (109) in the head of the bolt (100.1). The locking pin (7.20) is inserted through the aligned notch or crenel (143.1) and into the aligned aperture (109) of the bolt (100.1). As shown in FIGS. 1.2 and 1.3, the locking pin (7.20) is pushed through two apertures (109) in the bolt (100.1) and through a second aligned crenel (143.1) on the opposite side of locking nut (110.1). The end-stop (12.22) of the locking pin (7.20) contacts the merlons on both sides of the crenel (143.1) receiving the locking pin (7.20), which prevents the pin (7.20) from passing completely though the apertures (109) of the bolt (100.1). As the locking nut (110.1) is rotated counter-clockwise either by hand or by vibration, the locking pin (7.20) contacts the bottom (i.e. closed end) of the two aligned notches or crenels (143.1) as shown in FIGS. 1.3-1.4. This contact prevents any further counter-clockwise rotation of either the locking nut (110.1) or the bolt (100.1). A locking mechanism, therefore, is created. To unlock the locking system, the locking pin (7.20) is pulled out from the apertures (109) in the bolt (100.1) and the two aligned notches or crenels (143.1) using the pull ring (7.18). Once the locking pin (7.20) is removed, the locking nut (110.1) may rotate either clockwise or counter-clockwise on the external threads (92.1) of the girder (12.17) and the bolt (100.1) may rotate either clockwise or counter-clockwise on the internal threads (95.1) on the girder (12.17).

To assemble and use the locking system of the second embodiment, the counter-threaded bolt (100.1) is screwed into the counter-threaded bore (95.1) of the girder (12.17). The portion of the bolt (100.1) that is not screwed into the bore (95.1) of the girder (12.17) is then slid through bore (105.1) of the locking nut (110.1) until the internal threads of the bore (105.1) of the locking nut (110.1) contact the external threads (92.1) of the girder (12.17). The locking nut (110.1) is then screwed onto the girder (12.17) to the desired torque, then the cross grooves (2.14) are used to adjust the counter-threaded bolt (100.1) until one of the apertures (109) in the head of the bolt (100.1) is aligned with and exposed through one of the round apertures (143.2) of the locking nut (110.1). The locking pin (7.20) is inserted through the aligned aperture (143.2) of the locking nut (110.1) and into the aligned aperture (109) of the bolt (100.1). As shown in FIGS. 2.2 and 2.3, the locking pin (7.20) is pushed through two apertures (109) positioned on opposite sides of the bolt (100.1) and through a second aligned round aperture (143.2) on the opposite side of the locking nut (110.1). The end-stop (12.22) of the locking pin (7.20) contact the locking nut (110.1) along the periphery of aperture (143.2) receiving the locking pin (7.20), which prevents the pin (7.20) from passing completely though the aperture (109) of the bolt (100.1). As shown in FIGS. 2.3-2.4, a locking mechanism is created and the locking nut (110.1) and the bolt (100.1) are prevented from rotating both clockwise and counter-clockwise. This embodiment is preferred in applications of the locking system involving glass, bone, or other delicate assembly. To unlock the locking system, the locking pin (7.20) is pulled out from the apertures (109) in the bolt (100.1) and the two apertures (143.2) of the locking nut (110.1) using the pull ring (7.18). Once the locking pin (7.20) is removed, the locking nut (110.1) may rotate either clockwise or counter-clockwise on the external threads (92.1) of the girder (12.17) and the bolt (100.1) may rotate either clockwise or counter-clockwise on the internal threads (95.1) on the girder (12.17).

To assemble and use the locking system of the third embodiment, the counter-threaded bolt (100.1) is screwed into the counter-threaded bore (95.1) of the girder (12.17). The portion of the bolt (100.1) that is not screwed into the bore (95.1) of the girder (12.17) is then slid through bore (105.1) of the locking nut (110.1) until the internal threads of the bore (105.1) of the locking nut (110.1) contacts the external threads (92.1) of the girder (12.17). The locking nut (110.1) is then screwed onto the girder (12.17) to the desired torque, then the cross grooves (2.14) are used to adjust the counter-threaded bolt (100.1) until one of the apertures (109) in the head of the bolt (100.1) is aligned with and exposed through one of the oblong apertures (143.3) of the locking nut (110.1). The locking pin (7.20) is inserted through the aligned oblong aperture (143.3) and into the aperture (109) of the bolt (100.1). As shown in FIGS. 3.2 and 3.3, the locking pin (7.20) is pushed through two apertures (109) positioned on opposite sides of the bolt (100.1) and through a second oblong aperture (143.3) on the opposite side of locking nut (110.1). The end-stop (12.22) of the locking pin (7.20) contact the locking nut (110.1) along the periphery of oblong aperture (143.3) receiving the locking pin (7.20), which prevents the pin (7.20) from passing completely though the aperture (109) of the bolt (100.1). As the locking nut (110.1) is rotated either by hand or by vibration, the locking pin (7.20) has a pre-determined range of clockwise and counter-clockwise motion before it contacts the top or the bottom of the two aligned oblong apertures (143.3) as shown in FIGS. 3.3-3.4. This contact prevents any further rotation of either the locking nut (110.1) or the bolt (100.1). A locking mechanism, therefore, is created. This embodiment is preferred in applications of the locking system where a range of motion is desired, such as with an elevator control or garage door assembly. To unlock the locking system, the locking pin (7.20) is pulled out from the apertures (109) of the bolt (100.1) and the two aligned oblong apertures (143.3) using the pull ring (7.18). Once the locking pin (7.20) is removed, the locking nut (110.1) may rotate either clockwise or counter-clockwise on the external threads (92.1) of the girder (12.17) and the bolt (100.1) may rotate either clockwise or counter-clockwise on the internal (95.1) threads on the girder (12.17).

In a fourth preferred embodiment, the girder (12.17) includes a shaft that has an externally threaded terminus or end point (92.1) defining an internally counter-threaded axial bore (95.1) at each end of the girder (12.17). The girder (12.17) extends through an opening in one or more objects to be attached to the first object or through objects to be compressed together. As shown in FIGS. 4.1-4.4, the girder (12.17) can receive locking nuts (110.1) and bolts (100.1) on each end of the girder (12.17). A locking mechanism utilizing a locking nut (110.1), a bolt (100.1), and a locking pin (7.20), therefore, is created at each end of the girder (12.17) in the same manner as described above. This embodiment may also be utilized with any of the three different versions of the locking nut (110.1) described above. This embodiment is preferred in applications such as high-rise construction where steel beam and glass access is prevented or limited for the insertion of a lengthy bar or bolt, and when physical access to the interior or exterior walls do not allow the full length of the bar or bolt to be inserted. The locking nut (110.1) is versatile and may include the features of one or more of the embodiments of the locking nut described above. For example, as shown in FIGS. 4.1-4.4, the locking nut (110.1) includes the round aperture embodiment at one end and the notched embodiment at the opposite end.

In some applications, the locking nut (110.1) is disc-shaped (i.e. substantially flat top and bottom surfaces, thin, and round exterior sides) having a top planar surface and a central internally threaded transplanar bore (105.1). At least one pair of round apertures (143.2) are positioned on opposite sides of the top planar surface of the nut (110.1). In this embodiment of the nut (110.1), the apertures (143.2) do not extend through the bore (105.1). The top surface of the head of the bolt (100.1) extends above the top planar surface of the nut (110.1) to allow the pin (7.20) to be inserted through the apertures (143.2) of the nut (110.1) and the apertures (109) of bolt (100.1), thus creating a locking mechanism. This embodiment of the locking nut (110.1) may be preferable in surgical applications (e.g. deep bone and joint surgeries as well as other medical procedures where the locking nut will be positioned near the skin surface) because it has a minimal height and provides a fail-safe locking mechanism. It should be understood that the size of various components of the locking system of the present invention may vary depending on the application of the locking system.

The locking system of the present invention provides a positive lock on a bolt using any range of preferred torque without vibrating loose. The locking system eliminates the previous need for exacting torque specifications for fasteners that were intended to prevent loosening. Whether under-tightened or over-tightened, a bolt used in the locking system of the present invention will not come loose with vibration. The result is a fail-safe locking system with a wide range of applications in a diverse group of industries.

The present invention has been described with reference to certain preferred and alternative embodiments that are intended to be exemplary only and not limiting to the full scope of the present invention as set forth in the appended claims.

I claim:

1. A locking system comprising:
   (a) a girder having a first end and a second end, wherein said first end comprises an externally threaded terminus defining an internally counter-threaded bore;
   (b) a nut having a plurality of essentially vertical side walls and an internally threaded bore for rotational engagement with said terminus of said girder, wherein said essentially vertical side walls comprises a first opening and a second opening on opposite sides of said threaded bore of said nut; and
   (c) a counter-threaded bolt having a diameter smaller than said bore of said nut and a length sufficient to rotationally engage said bore of said girder while inserted through said bore of said girder, wherein said bolt comprises a head having a first aperture and a second aperture, wherein said first aperture is aligned with and positioned opposite said second aperture; and (d) a locking pin, wherein said nut is rotatable in a first direction on said threaded terminus of said girder when said locking pin is received through said first aperture and said second aperture of said bolt and through said first opening and said second opening of said nut until said locking pin contacts a bottom surface of said first opening or said second opening of said nut.

2. The system of claim 1, wherein said first opening and said second opening of said nut are oblong openings.

3. The system of claim 1, wherein said bolt is rotatable in said first direction in said internally counter-threaded bore when said locking pin is received through said first aperture and said second aperture of said bolt and through said first opening and said second opening of said nut until said locking pin contacts said bottom surface of said first opening or said second opening of said nut.

4. The locking system of claim 1, wherein said first opening and said second opening of said nut are notches having a curved bottom surface and an open top.

5. The system of claim 1, wherein said locking pin comprises an end-stop preventing complete push-through of said pin and a retraction-stop preventing un-insertion of said pin.

6. The system of claim 5, wherein said retraction-stop is a spring-biased detent ball.

7. The system of claim 5, wherein said end-stop comprises a circular pull ring.

8. The system of claim 1, wherein said second end of said girder is anchored to an object.

9. The system of claim 1, wherein said second end of said girder comprises an externally threaded terminus defining an internally counter-threaded bore.

* * * * *